United States Patent [19]

Udagawa

[11] Patent Number: 5,058,908

[45] Date of Patent: Oct. 22, 1991

[54] STEEL LAMINATE GASKET

[75] Inventor: Tsunekazu Udagawa, Ichikawa, Japan

[73] Assignee: Ishikawa Gasket Co., Ltd., Tokyo, Japan

[21] Appl. No.: 472,572

[22] Filed: Jan. 30, 1990

Related U.S. Application Data

[63] Continuation-in-part of Ser. No. 231,303, Aug. 11, 1988, Pat. No. 4,898,396.

[51] Int. Cl.[5] ..................... F16J 15/08

[52] U.S. Cl. ..................... 277/235 B; 277/234; 277/236

[58] Field of Search ........... 277/235 R, 235 A, 235 B, 277/236, 234

[56] References Cited

U.S. PATENT DOCUMENTS

| | | | |
|---|---|---|---|
| 1,846,402 | 2/1932 | Oven | 277/235 B |
| 1,851,948 | 3/1932 | Summers | 277/235 B |
| 1,911,226 | 5/1933 | Fitzgerald . | |
| 4,739,999 | 4/1988 | Ishii et al. | 277/236 |
| 4,759,585 | 7/1988 | Udagawa . | |
| 4,799,695 | 1/1989 | Yashino | 277/235 B |
| 4,826,708 | 5/1989 | Udagawa . | |

FOREIGN PATENT DOCUMENTS

| | | | |
|---|---|---|---|
| 55-53819 | 12/1980 | Japan . | |
| 59-113372 | 6/1984 | Japan . | |
| 61-2285 | 1/1986 | Japan . | |
| 61-35266 | 3/1986 | Japan . | |
| 0211660 | 8/1989 | Japan | 227/235 A |
| 1549200 | 7/1979 | United Kingdom . | |

*Primary Examiner*—William A. Cuchlinski, Jr.
*Assistant Examiner*—DePumpo
*Attorney, Agent, or Firm*—Kanesaka and Takeuchi

[57] ABSTRACT

A steel laminate gasket of the invention is used for an internal combustion engine having at least one cylinder hole and at least one through hole therein. The gasket comprises a first plate, a second plate situated under the first plate, and a third plate situated between the first and second plates. In order to seal around the cylinder hole, the gasket is provided with a first device, a second device for covering at least the first device, and a third device formed on at least one of the first, second and third plates and situated outside the second device. The first and second devices form solid portion around the cylinder hole, and the third device resiliently seal around the cylinder hole. A fourth device may be formed around the through hole to seal the same.

18 Claims, 2 Drawing Sheets

B10a B10c B11a Hw B B11a B10 B13 Hc B12a B10b B12 B13 B11

STEEL LAMINATE GASKET

CROSS-REFERENCE TO RELATED APPLICATION

This is a continuation in part application of Ser. No. 231,303 filed on Aug. 11, 1988, now U.S. Pat. No. 4,898,396.

BACKGROUND OF THE INVENTION AND RELATED ART STATEMENT

The present invention relates to a steel laminate gasket for an internal combustion engine to securely seal around cylinder holes and through holes.

An internal combustion engine is provided with a plurality of cylinder holes and other holes, such as holes for bolts, water, oil and push rods. When an engine is actuated, high pressure and high temperature are applied to the cylinder holes due to combustion of a fuel, while relatively low pressure and low temperature are applied to the other holes.

In order to properly seal between two engine blocks, such as a cylinder head and a cylinder block, of an engine, a gasket is situated between the two engine blocks and is tightened so that areas around the cylinder holes as well as the other holes are securely sealed. However, since the sealing conditions around the cylinder holes and other holes are different as explained above, it is not easy to securely seal around all the holes.

It has been known that beads are formed around the cylinder holes and other holes to securely seal around the holes. However, in case the beads are simply formed, sealing can not be perfectly made. Namely, while an engine is actuated, leakage may happen around the cylinder holes and other holes.

In some cases, seal rings may be separately attached around holes for water and oil. However, since the seal rings are separately prepared and installed in the gasket, it requires additional cost. Therefore, this method is not practical.

In U.S. Pat. No. 4,799,695, a metal laminate gasket is formed of an upper plate 1, and a lower plate 2 with a bead 3, as shown in FIG. 9 of the drawings filed herewith. An end of the upper plate 1 is folded and located under the lower plate 2 to form a flange 4. When this gasket is tightened between a cylinder head and a cylinder block, since an area on the flange 4 is formed of three plates and the rest of the portion is formed of two plates though the lower plate 2 has the bead 3, the cylinder head inclines relative to the cylinder block. Therefore, this structure is not practical.

Accordingly, an object of the present invention is to provide a steel laminate gasket which can seal properly around all kinds of holes in an engine.

Another object of the invention is to provide a steel laminate gasket as stated above, in which an area around a cylinder hole can be sealed strongly for a relatively wide width.

A further object of the invention is to provide a steel laminate gasket as stated above, in which sealing pressure around holes can be easily changed.

Further objects and advantages of the invention will be apparent from the following description of the invention.

SUMMARY OF THE INVENTION

A steel laminate gasket of the invention is installed in an internal combustion engine having at least one cylinder hole and at least one through hole therein. The gasket comprises a first plate, a second plate situated under the first plate and a third plate situated between the first and second plates. The third plate is not located adjacent to the cylinder hole.

The gasket further comprises first means for sealing around the cylinder hole without elasticity, second means for covering at least the first means around the cylinder hole, and third means for resiliently sealing around the cylinder hole. The third means is formed on at least one of the first, second and third plates outside the second means relative to the cylinder hole.

The gasket may further include fourth means for sealing around the through hole of the engine. The fourth means is formed on at least one of the first, second and third plates to securely seal around the through hole.

The first means is a steel plate in the form of a ring. The first means may be integrally formed with the first or second plate, or may be separately formed. The second means may be a grommet, or may be formed of a curved portion and a flange, which are integrally formed with the first or second plate. The first means is retained inside the second means to thereby form a solid portion around the cylinder hole.

The third means is at least one bead, which is formed on at least one of the first, second and third plates outside the second means relative to the cylinder hole. The fourth means is at least one bead formed on at least one of the first, second and third plates and situated around the through hole.

In the gasket of the present invention, the flat solid portion is situated around the cylinder hole, and at least one bead is situated outside the solid portion. Therefore, the gasket can be strongly tightened without deformation of a cylinder block or cylinder head, and also the bead can resiliently seal around the cylinder hole outside the solid portion.

Further, the third plate does not extend into the solid portion. Therefore, although resiliency of the bead may be changed by changing the thickness of the solid portion or the first and second plate, the resiliency of the bead can be easily changed by changing the thickness of the third plate.

Still further, since the third plate does not extend near the cylinder hole, sealing layers which are not strong against heat but effective to fluid can be coated on both sides of the third plate. As a result, fluid passing through the through hole can be effectively sealed, and does not enter into spaces between the plates.

DETAILED DESCRIPTION OF PREFERRED EMBODIMENTS

Figure 1:
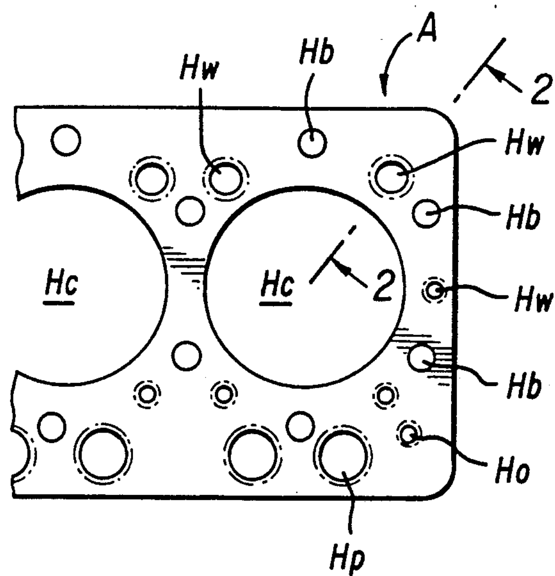
FIG. 1 is a partial plan view of a first embodiment of a steel laminate gasket of the present invention.
Figure 2:
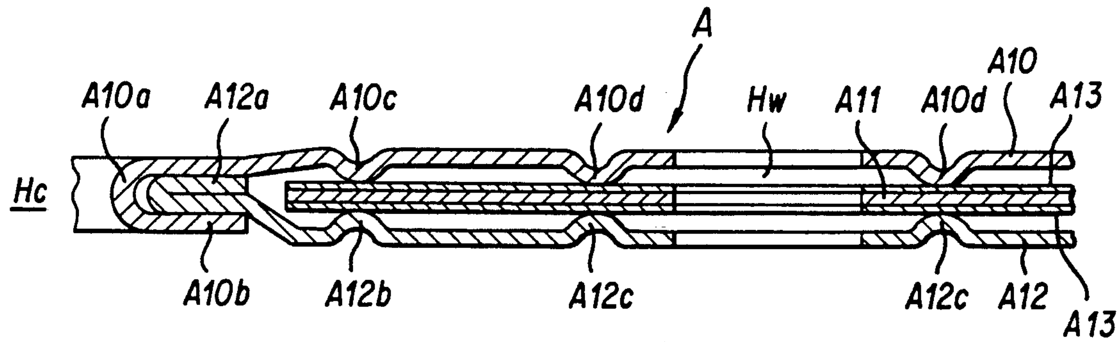
FIG. 2 is an enlarged section view taken along line 2-2 in FIG. 1.
Figure 3:
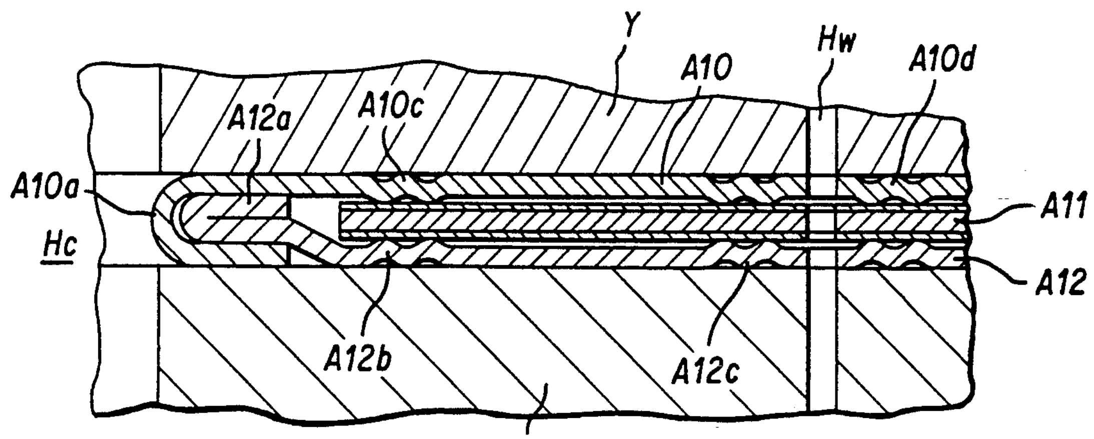
FIG. 3 is a section view showing tightened condition of the gasket as shown in FIG. 2.

Referring to FIGS. 1-3, a first embodiment A of a steel laminate gasket of the present invention is shown. The gasket A is provided with cylinder holes Hc, bolt holes Hb, water holes Hw, oil holes Ho and push rod holes Hp, as in the conventional gasket. The areas around the water holes Hw, oil holes Ho and push rod holes Hp are sealed in the same manner. For convenience, the cross section of the water hole Hw and cylinder hole Hc is shown in FIG. 2.

As shown in FIG. 2, the gasket A comprises an upper plate A10, a lower plate A12 and a middle plate All situated between the upper and lower plates A10, A12. The upper plate A10 includes a hole for the water hole Hw, a hole for the cylinder hole Hc, and a curved portion A10*a* to define the cylinder hole Hc. A flange A10*b* extends from the curved portion A10*a* in the direction away from the cylinder hole Hc.

The upper plate A10 is also provided with a bead A10*c* around the cylinder hole Hc, which is located outside the flange A10*b*. The bead A10*c* seals around the cylinder hole Hc. Further, a bead A10*d* is formed around the water hole Hw to seal therearound.

The lower plate A12 includes a hole for the water hole Hw and a hole for the cylinder hole Hc. An end portion or core A12*a* of the lower plate A12 adjacent the cylinder hole Hc is turned or bent to form a core. The core A12*a* is situated to pile on the flange A10*b*.

The lower plate A12 is also provided with a bead A12*b* around the cylinder hole Hc, which is located outside the flange A10*b* to correspond to the bead A10*c*. The bead A12*b* also seals around the cylinder hole Hc. Further, a bead A12*c* is formed around the water hole Hw to correspond to the bead A10*d* for sealing around the water hole Hw.

The middle plate All includes a hole for the water hole Hw and a hole for the cylinder hole Hc, which is larger than the cylinder hole Hc. Namely, the middle plate All does not extend adjacent the cylinder hole nor pile on the core A12*a*.

The middle plate A11 is also provided with upper and lower coatings A13 covering the entire surface thereof. The coatings A13 are made of a soft material to provide resiliency and seal around the water hole Hw. Gum, such as NBR gum and silicone gum is preferred, but soft resin may be used. The thickness of the coating A13 is 5–100 micra, preferably 10–50 micra. Alternatively, the coating A13 may be partly formed only around the required portion, such as a water hole.

When the gasket A is situated between a cylinder block X and a cylinder head Y and is tightened, as shown in FIG. 3, the curved portion A10*a* is bent, and the beads A10*c*, A10*d* on the upper plate A10 and the beads A12*b*, A12*c* on the lower plate A12 deform to form a plurality of corrugated beads, respectively.

In the gasket A, the core A12*a* and a part of the lower plate A12 are disposed between the flange A10*b* and a part of the upper plate A10 to form the flat solid portion. Therefore, even if the gasket A is tightened strongly, the cylinder head and cylinder block do not deform, because there is not a pressure concentrating portion thereat. Namely, the gasket A can be tightened strongly.

Further, since the gasket A is provided with the beads A10*c*, A12*b* outside the solid portion, when the gasket A is tightened, the beads A10*c*, A12*b* deform to securely seal around the cylinder hole Hc. Also, when the gasket A is tightened, the beads A10*d*, A12*c* deform to securely seal around the water hole Hw.

When an engine is operated, the engine vibrates, so that a gasket receives forces similar to beat the gasket, repeatedly. Therefore, beads around the cylinder hole are liable to suffer creep relaxation. In the present invention, the solid portion is formed adjacent the cylinder hole Hc, and the beads are formed outside the solid portion. Therefore, creep relaxation of the beads A10*c*, A12*b* is substantially prevented.

It is important in the present invention that the coating is made of a soft material, because the soft material seals properly between the plates to thereby prevent leakage of fluid from the water hole Hw. It is also important that the middle plate A11 does not extend to an area adjacent the cylinder hole Hc, because if the middle plate A11 extends to an area adjacent the cylinder hole Hc, the middle plate A11 is exposed to high temperature, which causes creep relaxation of the soft material formed on the middle plate A11. As a result, leakage may happen around the cylinder hole Hc.

Namely, an effective coating material around the water hole Hw is weak against heat. Therefore, such a coating material can not be applied onto a plate for sealing around the cylinder hole Hc. Accordingly, a middle plate which does not extend to an area adjacent the cylinder hole Hc is used, and a coating material effective to fluid is applied onto the middle plate.

Generally, small scratches are formed on outer surfaces of an engine block when manufacturing the engine block. In order to fill up the small scratches, coating which is strong against heat may be formed on outer surfaces of the gasket. Therefore, in the present invention, thin coatings may be formed on the outer surfaces of the upper and lower plates A10, A12 which contact the cylinder head and cylinder block.

Figure 4:
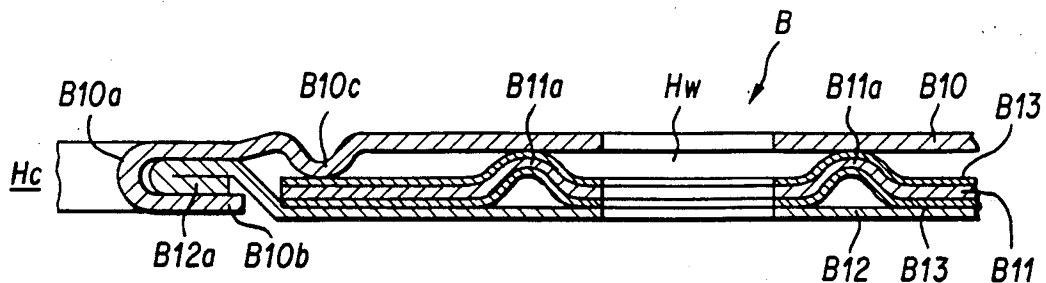
FIG. 4 is a section view, similar to FIG. 2, of a second embodiment of a steel laminate gasket of the invention.

FIG. 4 shows a second embodiment B of a steel laminate gasket of the invention. The gasket B comprises an upper plate B10 with a curved portion B10*a*, a flange B10*b* and a bead B10*c*, a middle plate B11 with coatings B13, and a lower plate B12 with a core B12*a*, similar to the gasket A.

In the gasket B, however, the upper and lower plates B10, B12 do not have beads around the water hole Hw, and instead, the middle plate B11 is provided with a bead B11*a*. Also, the core B12*a* faces against the flange B10*b*, and the lower plate B12 does not have a bead around the cylinder hole Hc. The rest of the gasket B is the same as the gasket A. The gasket B operates as in the gasket A.

Figure 5:
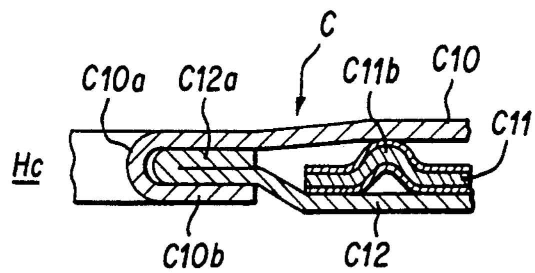
FIGS. 5-8 are section views showing sealing structures around cylinder holes of third to sixth embodiments of the steel laminate gasket of the invention.

FIG. 5 shows a third embodiment C of a steel laminate gasket of the invention. The gasket C comprises an upper plate CIO with a curved portion C10*a* and a flange C10*b*, a middle plate C11 with a bead C11*a* (not shown) around the water hole Hw, and a lower plate C12 with a core C12*a*, similar to the gasket B. However, in the gasket C, a bead around the cylinder hole Hc is not formed on the upper plate C10, and instead, a bead C11*b* is formed on the middle plate C11. The core C12*a* faces the upper plate C10, and the bead C11*a* (not shown) orients toward the upper plate C10. The gasket C operates as in the gasket B.

In the gasket B, the bead B10*c* faces the middle plate, and in the gasket C, the bead C11*b* is formed on the middle plate C11. However, these beads may face engine parts, wherein relatively sharp sealing pressure is directly applied to the cylinder block or cylinder head.

Figure 6:
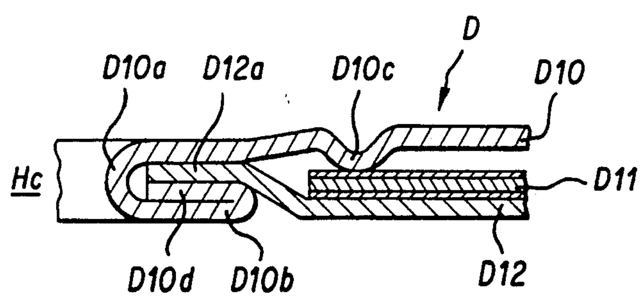

FIG. 6 shows a fourth embodiment D of a steel laminate gasket of the invention. The gasket D comprises an upper plate D10 with a curved portion D10*a*, a flange D10*b* and a bead D10*c*, a middle plate D11 with a bead (not shown) around the water hole Hw, and a lower plate D12, similar to the gasket B.

However, the lower plate D12 does not have a core, and instead, a core D10*d* is integrally formed with the flange D10*b*. Namely, the core D10*b* is formed by bending the upper plate to be located on the flange D10*c*. An end D12*a* of the lower plate D12 is located on the core D10*d*. The gasket D operates as in the gasket B.

Figure 7:
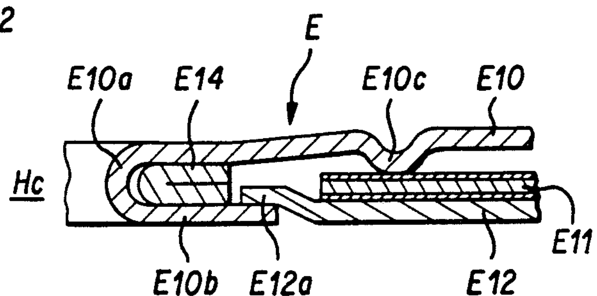

FIG. 7 shows a fifth embodiment E of a steel laminate gasket of the invention. The gasket E comprises an upper plate E10 with a curved portion E10*a*, a flange E10*b* and a bead E10*c*, a middle plate E11 and a lower plate E12, as in the gasket B. However, in the gasket E, a core E14 is separately formed and is situated above the flange E10*b*. An end E12*a* of the lower plate E12 is placed above the flange E10*b*. The gasket E operates as in the gasket B.

Figure 8:
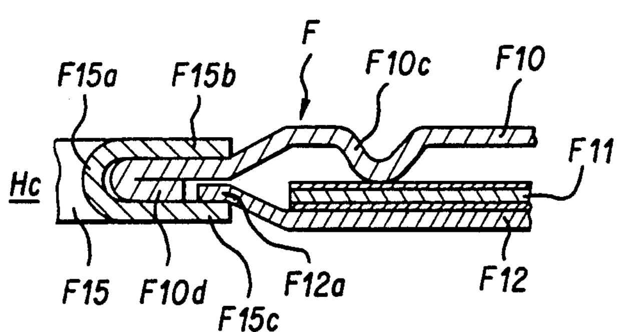
Figure 9:
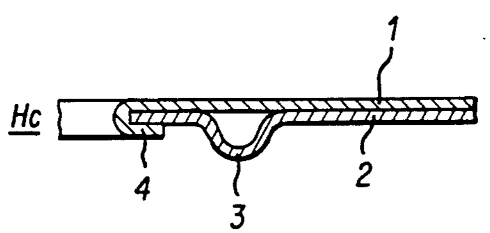
FIG. 9 is a section view around a cylinder hole of a conventional gasket.

FIG. 8 shows a sixth embodiment F of a steel laminate gasket of the invention. The gasket F comprises an upper plate F10 with a bead F10*c*, a middle plate F11 and a lower plate F12, as in the gasket B. However, the upper plate F10 does not have a curved portion nor flange. Instead, the upper plate F10 is provided with a core F10*d*, which is formed by bending an end portion of the upper plate F10.

Surrounding the core F10*d* and an end portion F12*a* of the lower plate F12 is a grommet F15 having a curved portion F15*a* and upper and lower flanges F15*b*, F15*c*. The grommet F15 protects the core F10*d* from combustion in the cylinder. The gasket F operates as in the gasket B.

In the gasket of the present invention, the solid portion is formed around the cylinder hole, and at least one bead is situated outside the solid portion. Therefore, the gasket can be tightened strongly, and moreover, the gasket can be resiliently sealed by the bead.

Also, in the present invention, the middle plate is not situated adjacent the cylinder hole. Therefore, the coating material which is weak against heat but effective to seal around the fluid holes can be coated onto the middle plate. The fluid holes can be effectively sealed as well.

While the invention has been explained with reference to the specific embodiment of the invention, the explanation is illustrative and the invention is limited only by the appended claims.

What is claimed is:

1. A steel laminate gasket for an internal combustion engine having at least one cylinder hole and at least one through hole therein, comprising:

a first plate having at least one first hole substantially corresponding to the cylinder hole of the engine, a second plate situated under the first plate, said second plate having at least one second hole substantially corresponding to the cylinder hole of the engine, at least one third plate situated between the first and second plates, said third plate including at least one third hole having a diameter larger than a diameter of the cylinder hole, first means for incompressibly sealing around the cylinder hole of the engine to securely seal around the same, second means for covering at least said first means for sealing around the first hole to securely seal therearound, said second means forming a solid portion around the cylinder hole together with the first means, and third means for incompressibly sealing around the cylinder hole, said third means being formed on at least one of the first, second and third plates outside the second means relative to the cylinder hole so that when the gasket is tightened, the first and second means seal incompressibly around the cylinder hole and the third means compressibly seals around the cylinder hole.

2. A steel laminate gasket according to claim 1, wherein said first means is a steel plate in the form of a ring.

3. A steel laminate gasket according to claim 2, wherein said first, second and third plates further include holes corresponding to the through hole of the engine, respectively, said gasket further comprising fourth means for sealing around the through hole formed on at least one of the first, second and third plates.

4. A steel laminate gasket according to claim 3, wherein said third plate further includes sealing layers formed on both sides of the third plate.

5. A steel laminate gasket according to claim 4, wherein said sealing layers are made of soft materials to prevent fluid from passing between the plates.

6. A steel laminate gasket according to claim 3, wherein said third means is at least one bead situated around the cylinder hole.

7. A steel laminate gasket according to claim 6, wherein said fourth means is at least one bead situated around the through hole.

8. A steel laminate gasket according to claim 7, wherein said second means is integrally formed on one of the first and second plates.

9. A steel laminate gasket according to claim 8, wherein said first means is integrally formed with the second plate by bending the second plate, and said second means includes a curved portion and a flange and is integrally connected to the first plate, said curved portion extending from the first plate toward the second plate around the first hole to define the first hole, and said flange extending from the curved portion in the direction away from the first hole, said flange being located underside the second plate, said first means being situated outside the curved portion relative to the first hole.

10. A steel laminate gasket according to claim 9, wherein said third and fourth means are beads formed on the first and second plates, respectively, said beads extending toward the third plate.

11. A steel laminate gasket according to claim 9, wherein said third means is formed on one of the first and second plates, and said fourth means is formed on the third plate.

12. A steel laminate gasket according to claim 8, wherein said second means comprises a curved portion and a flange and is integrally connected to the first plate, said curved portion extending from the first plate toward the second plate around the first hole to define the first hole, said flange extending from the curved portion in the direction away from the first hole, said first means being formed by bending a part of the flange to laminate thereon, and said second plate extending adjacent to the curved portion to laminate the flange.

13. A steel laminate gasket according to claim 8, wherein said first means is a laminated ring having flat upper and lower surfaces, and said second means comprises a curved portion and a flange and is integrally connected to the first plate, said curved portion extending from the first plate toward the second plate around the first hole to define the first hole, said flange extending from the curved portion in the direction away from the first hole, said first means being situated adjacent to the curved portion to laminate the flange, and said second plate extending toward the curved portion to laminate the flange.

14. A steel laminate gasket according to claim 7, wherein said first means is integrally formed with the first plate by bending the same, and said second means is a grommet having upper and lower flanges, said first means and a part of the second plate being situated between the upper and lower flanges.

15. A steel laminate gasket for an internal combustion engine adapted to be installed between two engine parts, said gasket having at least one cylinder hole and at least one through hole therein, comprising:

a first plate having at least one first hole substantially corresponding to the cylinder hole of the engine, a second plate situated under the first plate, said second plate having at least one second hole substantially corresponding to the cylinder hole of the engine, at least one third plate situated between the first and second plates, said third plate including at least one third hole having a diameter larger than a diameter of the cylinder hole, first means for incompressibly sealing around the cylinder hole of the engine to securely seal around the same, second means for covering at least said first means for sealing around the first hole to securely seal therearound, said second means being integrally formed with one of the first and second plates and forming a solid portion around the cylinder hole together with the first means, said solid portion having a predetermined width around the cylinder hole and being incompressibly to prevent deformation of the engine parts when the gasket is tightened, and third means for compressibly sealing around the cylinder hole, said third means being formed of at least one bead and provided on at least one of the first, second and third plates outside the second means relative to the cylinder hole so that when the gasket is tightened, the first and second means compressibly seal around the cylinder hole and the third means compressibly seals around the cylinder hole to thereby allow the gasket to be tightened at high pressure without deformation of the engine parts.

16. A steel laminate gasket according to claim 15, wherein said first means has an annular shape and is integrally formed with the second plate by bending the same, and said second means includes a curved portion and a flange integrally connected to the first plate, said curved portion extending from the first plate toward the second plate around the first hole to define the first hole, and said flange extending from the curved portion in the direction away from the first hole, said first means and a part of the second plate being located between the flange and the first plate.

17. A steel laminate gasket according to claim 15, wherein total thicknesses of laminate portions at the solid portion is thicker than total thicknesses of laminate portions outside the solid portion.

18. A steel laminate gasket according to claim 1, wherein total thicknesses of laminate portions at the solid portion is thicker than total thicknesses of laminate portions outside the solid portion.

* * * * *